Aug. 16, 1966　　　W. H. DECKER　　　3,267,026
METHOD OF DETECTING DECLINE IN CATALYST ACTIVITY
Filed Sept. 6, 1960　　　2 Sheets-Sheet 1
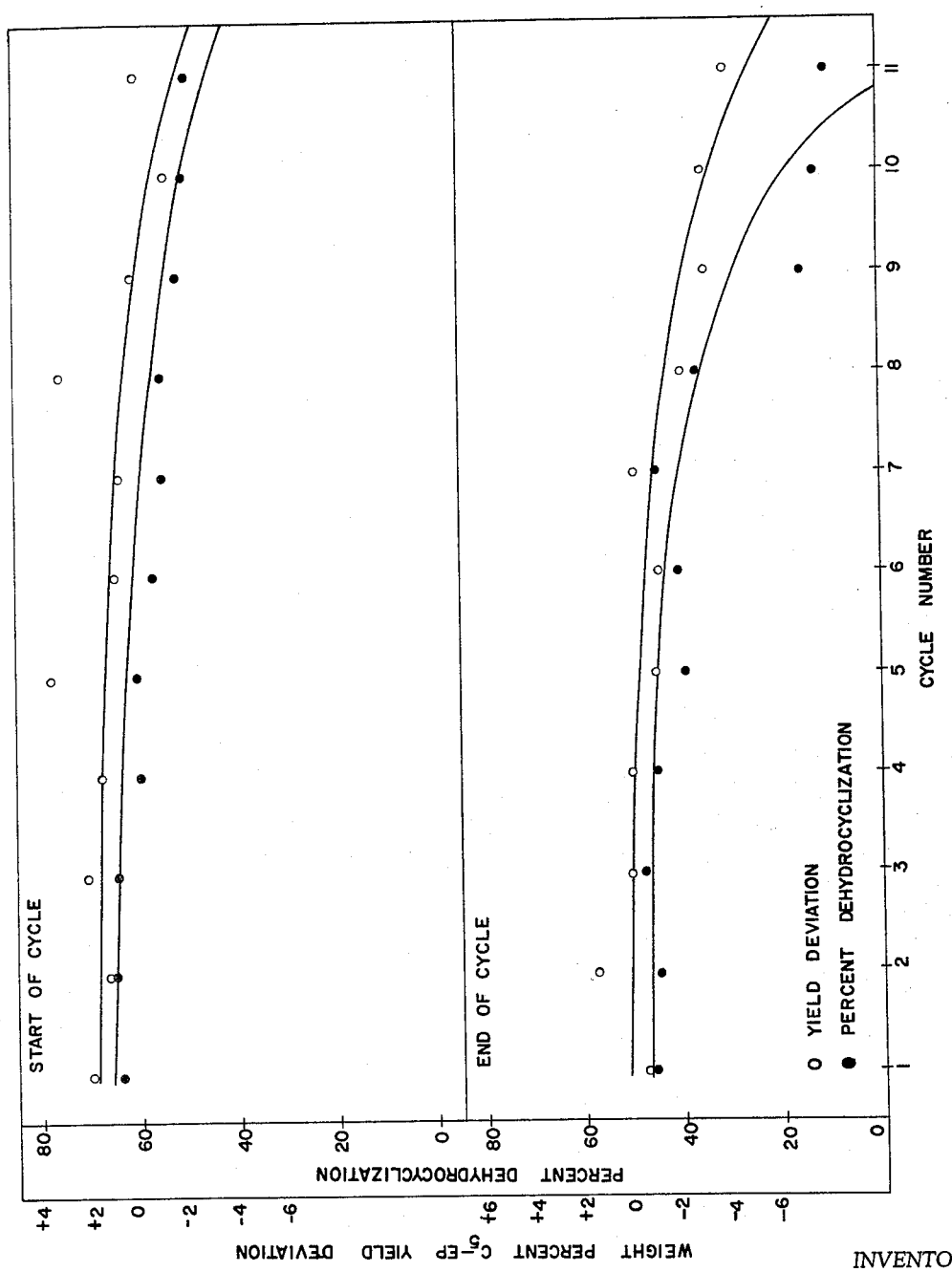
INVENTOR
WILLIAM H. DECKER
BY *Adams, Forward & McLean*
ATTORNEY

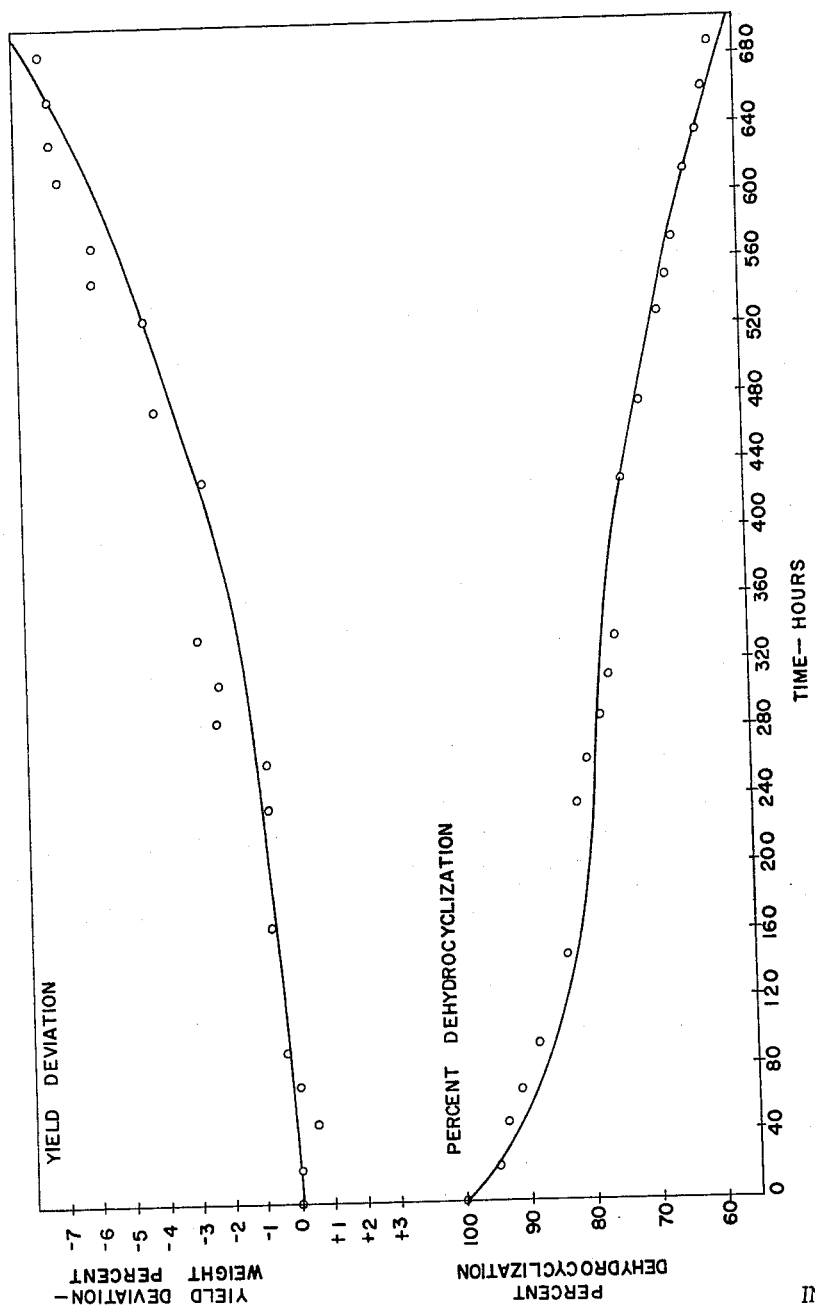

3,267,026
METHOD OF DETECTING DECLINE IN CATALYST ACTIVITY

William H. Decker, Chicago, Ill., assignor, by mesne assignments, to Sinclair Research, Inc., New York, N.Y., a corporation of Delaware
Filed Sept. 6, 1960, Ser. No. 53,935
2 Claims. (Cl. 208—140)

The present invention relates to a method for evaluating the catalytic activity of reforming catalysts. More particularly, the present invention relates to a method for determining the catalyst activity in reforming systems to optimize the processing cycle lengths of such systems.

At the present time one of the most important refinery processes is catalytic reforming and although of fairly recent development it is apparent that this process will assume increasing importance because of the necessity for both higher octane blending stocks and stocks with selected qualities. The reforming process is of considerable importance to the refiner in that it is one of the basic methods for the production of petrochemicals. It is because of these factors that the operation of the catalytic reformers must be optimized wherever possible in order to secure the maximum process benefits.

Early in the development of reforming catalysts and the associated process it was found that if the processing cycle were continued for too long a period a severe yield loss would be encountered and this would also be accompanied by a loss in catalyst regeneration efficiency by carbon burn-off. Studies have indicated that in the production of a given octane reformate, a severe loss of yield occurs when the catalyst activity has declined or changed to a relatively low level. Consequently, when the process cycle is continued beyond this level, oftentimes under increased temperatures to maintain a constant product octane, the regeneration efficiency of the catalyst is adversely effected. The combustion of the increased coke deposits on the catalyst results in extremely high temperatures within the catalyst particles which temperatures are believed to have an adverse effect on the catalyst itself.

Considerable difficulty has been experienced, however, in determining the exact point in the process cycle where this decline or change in catalyst activity occurs. In accordance with prior methods, this loss in yield was found to occur when the catalyst activity had declined to what was defined as the 0.4 relative activity level (overall), or 0.25 when considering only the terminal reactor. In this method, the relative activity was defined as the ratio of space velocities required to produce a given octane reformate. Such a definition is obviously empirical and is only a measure, in a broad sense, of all of the various reactions that are involved in the reforming process. Thus, just when to remove the catalyst from the reforming process cycle and regenerate the catalyst or replace it with new active catalyst has continually been a perplexing problem to the petroleum refiner. The combination of these factors of yield loss and loss in regeneration efficiency makes highly desirable a technique that will permit the determination of the catalyst activity within narrow limits and thus permit realistic optimization of the processing cycle length.

It has now been discovered that the overall activity of reforming catalysts can be determined by providing a reformer feedstock with a small amount of a radioactively tagged ($C_{14}$) normal paraffin of 6 to about 11 carbon atoms, and passing the feedstock together with the radioactively tagged paraffin into a catalytic reforming system, withdrawing a sample of reformate product and determining the amount of radioactive material in the aromatic fraction of the liquid reformate product. The amount of radioactive material in the aromatic fraction compared to the radioactive material in the total liquid reformate determines directly the dehydrocyclization activity in the reformer since tagged paraffin is being dehydrocyclized in essentially the same proportions as normal paraffins in the feed. A decrease in the percent of dehydrocyclization has been found to bear a close relationship to liquid yield loss, the rate of decline of the dehydrocyclization activity during processing can be related to the decline of overall catalyst activity. Thus, in accordance with the method of the present invention the region of limiting relative catalyst activity in the reforming process cycle can be determined by simply and accurately following the rate of change of dehydrocyclization activity and locating the period in the process cycle wherein there is a relatively rapid decrease in the dehydrocyclization activity. As aforementioned the dehydrocyclization activity is simply measured by dividing the total "counts" (a measure of the presence of the tagged molecules) found in the aromatic fraction of the liquid reformate by the total "counts" in the total liquid reformate product. More specifically this relationship can be defined as:

$$\frac{A}{P+N+A}$$

where $A$=counts in aromatic fraction, $P$=counts in paraffin fraction and $N$=counts in naphthene fraction.

The aromatic fraction of the liquid product can be separated for testing by any means known to the art as for example by solvent extraction, etc. Any known standard method may be used for measuring the radioactivity or "counts" as, for example, by use of a scintillation counter, Geiger counter, etc.

The "tagged" normal paraffins suitable for use in the present invention are the normal paraffins that fall in the boiling range of the particular naphtha being fed to the reforming unit. Generally, the "tagged" normal paraffin will contain from 6 to about 11 carbon atoms depending on the boiling range of the naphtha employed and the conditions under study. For typical straight run naphtha the preferred tagged normal paraffin is tagged ($C_{14}$) normal octane. The amount of tagged normal paraffin introduced into the feed will vary depending on the volume of the reforming system, i.e. catalyst inventory, but will generally be sufficient to provide at least about 0.1 millicurie of radioactivity. The amount of tagged material can vary considerably and I prefer about 0.5 to 2 millicuries; larger amounts have not been found to be necessary and are, of course, costly. Conveniently on a commercial basis, the tagged paraffin will be introduced as a hydrocarbon solution, say of about 25 to 200 milliliters. For best results the tagged paraffin should be introduced more or less instantaneously as a slug into the reforming feedstock, and addition over an extended period of several minutes or more, although possible seems neither necessary nor desirable in a commercial operation.

The present invention is applicable to any reforming operation conducted over reforming catalysts disposed in fixed position, i.e. fixed-bed process. The method may be applied to a feed introduced at the start of a reforming system containing a single or plurality of fixed catalyst beds or added to any one or more reactors in series and the catalyst in said reactors can be discarded or regenerated depending on the results obtained, by appropriate determination of the radioactivity of the effluent from the reactor or series of reactors in question. In reforming the reactor conditions generally fall within the following ranges: temperature, between about 850 to 1000° F.; pressures, between about 100 to 1000 p.s.i.g.; weight hourly space velocity about 1 to 8; molecular hydrogen recycle, about 500 to 5000 standard cubic feet per barrel of feed. Preheaters are often used in reforming systems before each reactor to provide the reactor or reactors with hydrocarbon of temperatures that may vary between about 850° F. to 975° F. The reaction zone in the reforming process can constitute a single reactor or multiple reactors. Reformer feedstocks are petroleum straight run or reformed naphthas which usually boil primarily in the range of about 100 to 400° F., preferably about 200 to 350° F. and are made up predominantly of paraffins, naphthenes and aromatics with little if any olefins. The liquid product boils essentially in the gasoline or naphtha range and is of increased octane number rating as compared with the feedstock.

The catalyst employed in the process of the present invention includes catalytically effective amounts of a noble or platinum group metal supported on an alumina base. The catalyst generally contains about 0.01 to 2 weight percent, preferably 0.1 to 1 weight percent, of one or more of the platinum metals of Group VIII, that is platinum, palladium, rhodium, ruthenium, osmium or iridium. The small amount of noble metal may be present in the metallic form or as a sulfide, oxide or other combined form. The metal may interact with other constitutents of the catalyst, but if during use the noble metal be present in metallic form, then it is preferred that it be so finely divided that it is not detectable by X-ray diffraction means, i.e. that it exists as crystals of less than 50 Angstrom units size. Of the noble metals, platiuum is preferred.

The noble metal of the catalyset is deposited on an absorptive alumina base of the activated or calcined type. The catalyst base is an activated or gamma alumina such as those derived by calcination of amorphous hydrous alumina, alumina monohydrate, alumina trihydrate or their mixtures. The catalyst base precursor most advantageously is a mixture predominating in or comprising a major portion of, for instance, about 65 to 95 weight percent of one or more of the alumina trihydrates bayerite I, bayerite II (randomite) or gibbsite. An alumina of this latter type is disclosed in U.S. Patent No. 2,838,444. The alumina base can contain small amounts of other oxides such as silica, magnesia, natural or activated clays, titania, zirconia, etc., or their mixtures. The preferred catalyst contains platinum deposited on activated alumina.

The platinum metal component of the catalyst can be added to the alumina base by known procedures. For instance, the platinum metal component can be deposited on a calcined or activated alumina, but it is preferred to add the platinum metal component to the alumina hydrate base precursor. Thus platinum can be added through reaction of a halogen platinum acid, for instance, fluoro-, chloro-, bromo- or iodo-platinic acid, and hydrogen sulfide in an aqueous slurry of the alumina hydrate. The hydrogen sulfide can be employed as a gas or an aqueous solution. Alternatively, the platinum component can be provided by mixing an aqueous platinum sulfide sol with the alumina hydrate. This sol can be made by reaction in an aqueous medium of a halogen platinic acid with hydrogen sulfide. The alumina hydrate containing the platinum metal can be dried and calcined usually at a temperature from about 750 to 1200° F. or more to provide the activated or gamma alumina modifications.

Although the noble metal-alumina catalyst can be activated during reforming, it can be pre-reduced or pre-activated. Pre-activation can be accomplished by treatment with hydrogen at an elevated temperature, for instance about 800 to 1000° F. Rather than pre-activate the catalyst it can be used directly in the process and the presence of the free hydrogen gas will cause activation in the initial stages of the process.

The catalyst employed in the process of the present invention can be easily regenerated employing conventional procedures, for instance by subjecting it to an oxygen-containing gas at temperatures sufficient to burn off carbon deposited on the catalyst during the conversion of petroleum hydrocarbon feedstock. This oxygen-containing gas, e.g. an oxygen-nitrogen mixture, can contain about 0.01 weight percent to 5 weight percent oxygen and is introduced at a flow rate such that the maximum temperature at the site of combustion is below about 1000° F.

The invention will be further illustrated by the following examples:

Example I

A small amount of tagged normal octane ($C_{14}$) was added to a straight run naphtha (reformer feed) and the feed and tagged normal octane mixture giving about 6000 counts per milliliter minute on a Geiger counter was passed to a reforming system having a platinum-alumina catalyst bed conversion zone. The reactor conditions employed were as follows: temperature, 975° F.–1000° F.; pressure, 350 p.s.i.g.; weight hourly space velocity, 4.0; recycle gas to hydrocarbon ratio of 7.0/1.0.

Eleven 144-hour cycles were run with regeneration of the catalyst after each cycle. Regeneration or carbon burn-off was accomplished by contact with a free oxygen-containing gas. At the end of each cycle the yield of $C_5$ to EP liquid product was recorded. Also "count" determinations were made of the liquid product and the aromatic fraction in the liquid product removed therefrom by a standard glycol-water extraction process. The yield data was correlated and compared with the first cycle (virgin catalyst condition) in order to determine the amount of liquid product ($C_5$–EP) loss per cycle. These data together with the percent dehydrocyclization data, defined by the total counts in the aromatic fraction over the total counts in the total liquid product $\times 100$, are placed on FIGURE 1.

Inspection of this figure indicates that even though there is a scattering of data that it is feasible to represent these data by smoothed curves. These curves show a reasonably close relationship between the change in yield structure and the change in the percent of dehydrocyclization. Thus a loss in the dehydrocyclization activity is indicative of a corresponding loss in the $C_5$–EP yield with the data shown for the latter cycles being most striking. These latter cycles would show an even better relationship if a correction were made in the yields to account for the loss in octane that occurred in the latter cycles.

Example II

A small amount of tagged normal octane ($C_{14}$) was added to a 88 Research Octane Number clear reformate (previously reformed straight run naphtha) and the reformate and tagged octane mixture indicating about 6000 counts per milliliter per minute on a Geiger counter was processed over a platinum-alumina catalyst at conditions of 350 p.s.i.g., 4.0 weight hourly space velocity and with gradually increasing temperature in the range of about 940 to 995° F. and hydrogen recycle throughout the run so as to maintain essentially constant octane. This run was carried out continuously without regeneration for a period in excess of 600 hours. The dehydrocyclization activity and yield were followed by removing and testing samples of liquid product periodically in accordance with the procedure of Example I. The yield data was correlated and compared with yield data on virgin catalyst operations corrected to a constant 100 RON (clear) so that the amount of liquid yield loss could be determined. These data with the results of the dehydrocyclization data are presented in FIGURE II. The dehydrocyclization activity in FIGURE II is defined as $100-(Hv-Ha)$ where $Hv$ and $Ha$ are the dehydrocyclization activities for virgin and aged catalyst operation activities respectively.

The data shows that the yield remained relatively constant until about 280 hours of the run elapsed, and after this time there is a sharp loss in the liquid yield. The hydrocyclization activity first showed a relatively rapid loss in activity during the first 80 to 100 hours of the cycle, a condition that would be related directly to the loss in "flush activity" of the catalyst. From this point on, the activity declined slowly until about 280 hours of run time and then underwent a relatively rapid loss substantially consistent with the yield loss over the same period. The period in which there was a definite break in both the yield structure and the hydrocyclization activity, i.e., about 280 to 340 hours, was the region of limiting relative catalyst activity.

What is claimed:

1. A method for optimizing the process cycle length of a naphtha reforming system containing a platinum metal alumina catalyst which comprises introducing petroleum naphtha containing radioactive normal paraffin of 6 to about 11 carbon atoms into a reforming system containing said catalyst in fixed position and operating at a temperature of about 850 to 975° F. and a pressure of about 100 to 1000 p.s.i.g. to produce higher octane number liquid product, withdrawing a sample of said product and determining the percentage of said paraffin converted to aromatics by measuring the radioactive content of essentially the total liquid product and the radioactive content of the aromatic fraction of said liquid product, stopping the reforming operation when the amount of aromatics produced from said radioactive paraffin substantially declines, contacting the catalyst with an oxygen-containing gas to remove carbon deposited thereon during the reforming operation, and reusing the catalyst to reform petroleum naphtha to higher octane number liquid product under said temperature and pressure conditions.

2. The method of claim 1 wherein the normal paraffin is normal octane.

References Cited by the Examiner

UNITED STATES PATENTS

| | | | |
|---|---|---|---|
| 2,903,417 | 9/1959 | Beaugh et al. | 196—132 |
| 2,945,127 | 7/1960 | Hanson | 250—106 |
| 2,954,989 | 10/1960 | Hull | 200—106 |

DELBERT E. GANTZ, *Primary Examiner.*

ALPHONSO D. SULLIVAN, MILTON STERMAN, *Examiners.*

A. RIMENS, H. LEVINE, *Assistant Examiners.*